Sept. 11, 1934.  T. H. HART  1,973,530
BROODER CAGE
Filed July 3, 1931  3 Sheets-Sheet 1
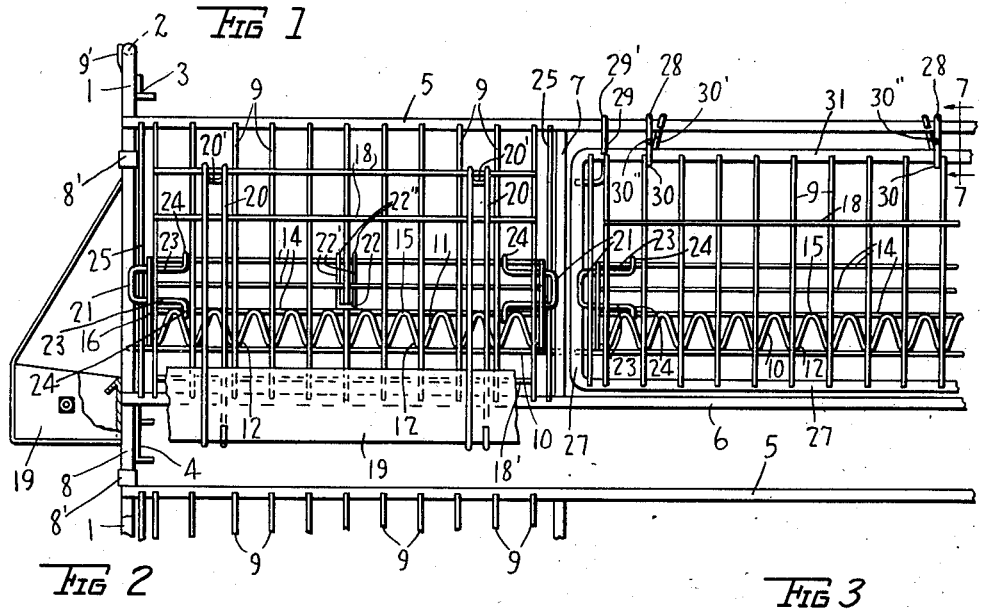
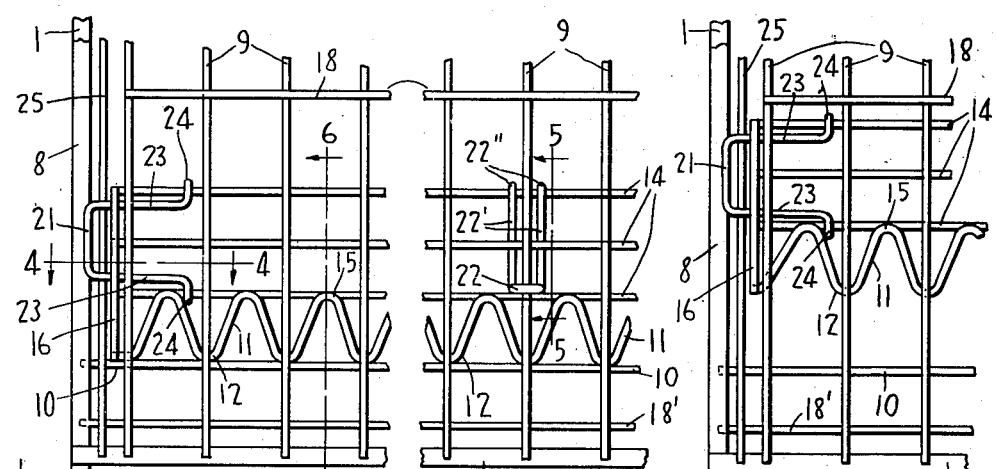
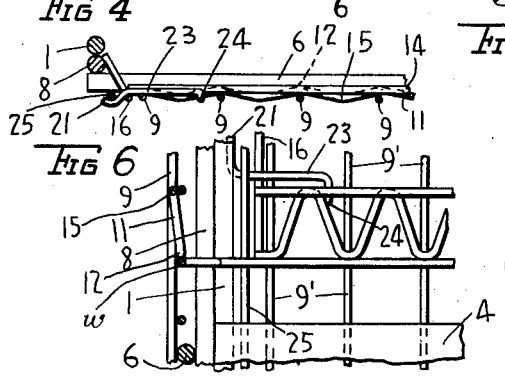
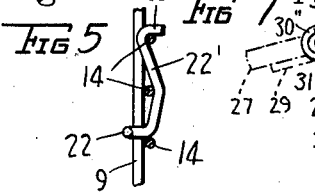
INVENTOR
Thomas H. Hart
BY Staley & Miller
ATTORNEYS Sept. 11, 1934. T. H. HART 1,973,530
BROODER CAGE
Filed July 3, 1931 3 Sheets-Sheet 2
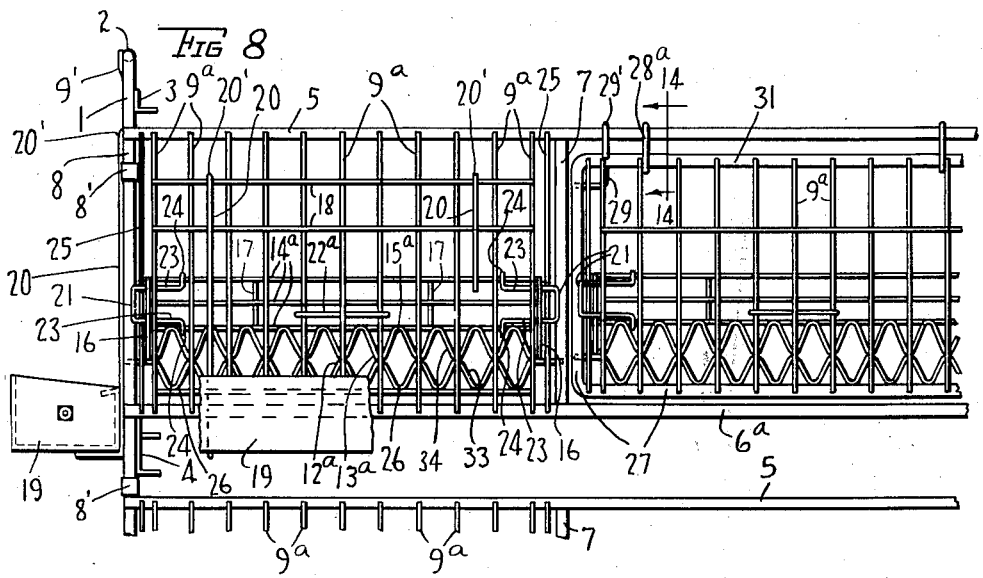
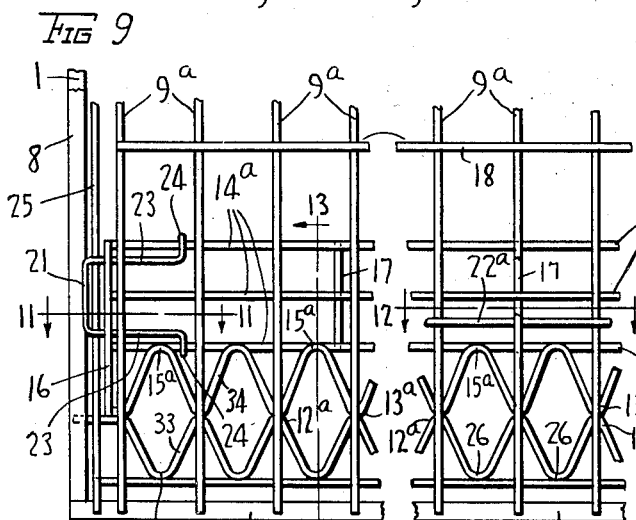
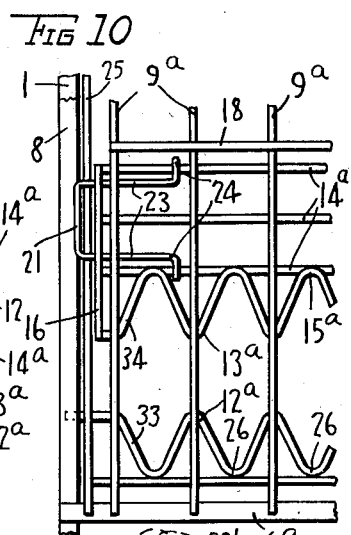
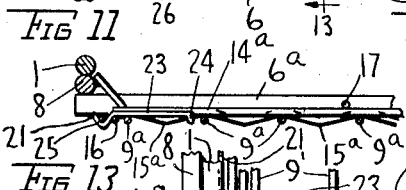
INVENTOR
Thomas H. Hart
ATTORNEYS Sept. 11, 1934.  T. H. HART  1,973,530
BROODER CAGE
Filed July 3, 1931  3 Sheets-Sheet 3
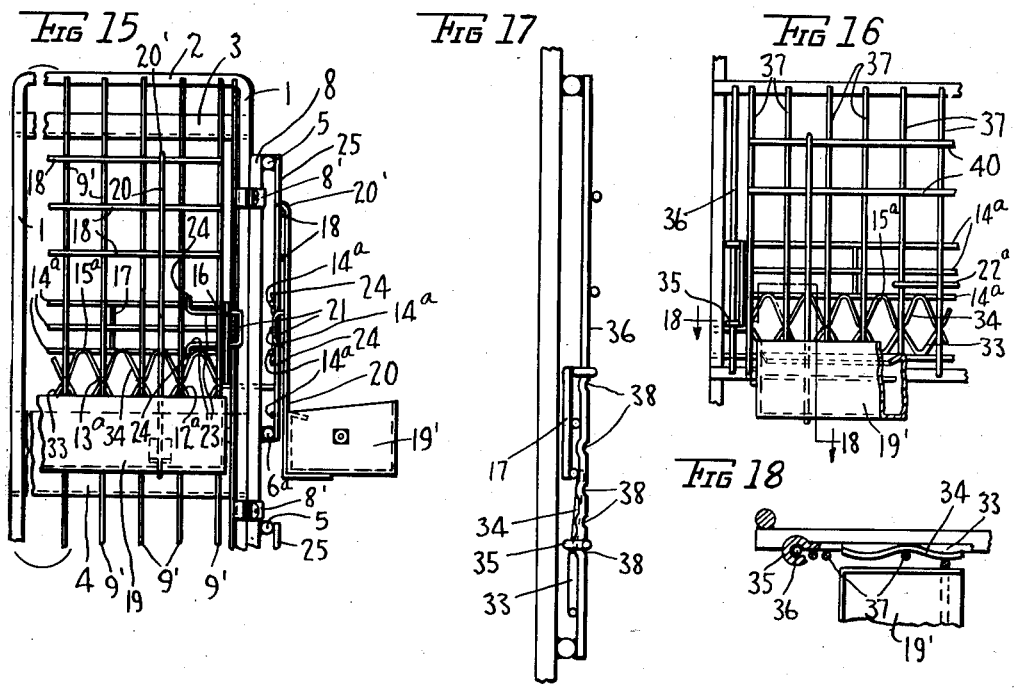
INVENTOR
Thomas H. Hart
BY Staley & Melch
ATTORNEYS Patented Sept. 11, 1934

1,973,530

UNITED STATES PATENT OFFICE 1,973,530

BROODER CAGE

Thomas H. Hart, Springfield, Ohio, assignor to The Buckeye Incubator Manufacturing Company, Beachwood, Ohio, a corporation of Ohio Application July 3, 1931, Serial No. 548,603

15 Claims. (Cl. 119—17)

This invention relates to brooder cages for poultry, it more particularly relating to the feed openings.

In the construction of brooder cages or coops with feed openings, difficulty has been experienced in providing feed openings which will be of a form to prevent the escape of the chicks from the coop and at the same time provide for a comfortable feeding of the chicks therethrough. It has been found that a feed opening which has a portion thereof converged to a substantially V-shape is an effective form of an opening for the purpose. It is customary in coops of this character to provide means for varying the size of the feed openings such as to adapt the openings for different stages of growth of the chicks.

It is an object of this invention to provide means for varying the size of the feed openings to adapt them to the different stages of growth of the chicks and at the same time retain the desired form of the opening so that each opening, regardless of its size, will have a portion thereof which is converged to a substantially V-shape.

In the accompanying drawings:

Fig. 1 is a front elevation of a portion of a brooder cage constructed according to one embodiment of the invention.

Fig. 2 is a partial front elevation on an enlarged scale to show more clearly the construction illustrated in Fig. 1.

Fig. 3 is also an enlarged front elevation of a portion of a coop, the view being similar to Fig. 2, but with some of the parts in a different working position.

Fig. 4 is an enlarged fragmentary horizontal section on the line 4—4 of Fig. 2.

Fig. 5 is an enlarged fragmentary vertical section on the line 5—5 of Fig. 2.

Fig. 6 is an enlarged fragmentary vertical section on the line 6—6 of Fig. 2.

Fig. 7 is an enlarged fragmentary vertical section on the line 7—7 of Fig. 1.

Fig. 8 is a front elevation of a portion of a brooder cage constructed according to another form of the invention.

Fig. 9 is a partial front elevation on an enlarged scale showing more clearly details of the construction seen in Fig. 8.

Fig. 10 is also an enlarged front elevation of a portion of a coop, the view being similar to Fig. 9, but with some of the parts in a different working position.

Fig. 11 is an enlarged fragmentary horizontal section on the line 11—11 of Fig. 9.

Fig. 12 is an enlarged fragmentary horizontal section on the line 12—12 of Fig. 9.

Fig. 13 is an enlarged fragmentary vertical section on the line 13—13 of Fig. 9.

Fig. 14 is an enlarged fragmentary vertical section on the line 14—14 of Fig. 8.

Fig. 15 is a side elevation of a portion of the cage.

Fig. 16 is a front elevation of a portion of a cage in which the invention is in a slightly modified form.

Fig. 17 is an enlarged view showing in side elevation some of the details of the coop form shown in Fig. 16.

Fig. 18 is an enlarged partial horizontal section on the line 18—18 of Fig. 16.

The brooder in connection with which my improvements have been shown is of the battery type in which a series of superimposed cages are employed, but I have considered it sufficient for the purpose of illustration to show but a portion of one of the cages. In such a type of brooder the main side frames are formed of U-shaped members, one of which is shown in the present case, and consists of vertical bars 1 connected by a horizontal top bar 2. The bars 1 are tied together by a plurality of angle members 3 and 4, which form supports for drip pans, reticulated floors, and heating elements (not shown). The two U-frames are tied together at the rear by the members which are not shown, and at the front by a plurality of horizontal members 5 and 6, each pair of which defines the top and bottom of the front panel of a cage. Each pair of members 5 and 6 are further tied together by vertical bars 7, one of which is shown in the present case, which define the sides of a doorway, and at their ends by vertical rods 8 which are secured to the vertical rods 1 by clamping members 8'. Extending between the bars 5 and 6 is a series of vertical rods 9 formed of wire, preferably connected to the bars 5 and 6 by spot welding. The sides and rear end are enclosed by similar wires 9' which extend however throughout the extreme height of the U-frames 2. Co-operating with these wires to confine the chicks to the cage is a plurality of cross members, some of which form feed openings which may be varied as to size in order to adapt the cages to chicks of different stages of growth, as will now be described.

The feed openings in the first embodiment of the invention are formed by a straight wire 10 and wire 11 bent to a zig-zag form. The lower straight wire 10 is fixed to the rear sides of the vertical wires 9 at points near the lower frame rod 6, while the upper zig-zag wire 11 is a part of a slidable frame positioned on the rear sides of the wires 9, the lower apexes of the zig-zag wire 11, indicated at 12 being in contact with the wire 10 when it is desired to reduce the feed openings to their smallest dimensions suitable for chicks in the first stage of growth, and these apexes determine the width of such openings. The slidable frame mentioned includes a plurality of horizontally extending wires 14, to the lowermost of which the upper apexes 15 of the zig-zag wire 11 are joined preferably by spot welding, while the extremities of the wires 14 and the zigzag wire 11, are connected together by short vertically-extending rods 16. The wires 14 are for the purpose of preventing the escape of the chicks above the zig-zag wire 11 and there are also preferably provided additional upper stationary cross wires 18 and a lower stationary cross-wire 18' spot welded to the wires 9; one of the wires 18 also acting as a support for the feed troughs 19 through the medium of trough hangers 20, each having a hooked end 20' which hooks over one of the wires 18.

When adjusted for feed openings of the smallest size, the two cross-wires 10 and 11 form openings of greater height than width, the sides of each of which converge upwardly, the distance between the portions 12 of the wire 11 representing the greater width of the openings.

This form of opening has been found to not only prevent the escape of the chicks more effectively than other forms of feed openings but at the same time allow for the more comfortable feeding of the chicks in that they permit of the characteristic up and down movement of the head and neck of the chicks; another advantage of this form of opening being that there is no danger of the chicks becoming caught by the walls of the openings as was common with other forms of openings.

When the chicks reach the next stage of growth it is necessary, in order to avoid removing the chicks to other cages with larger feed openings, to adjust the size of the feed openings and in order to do this without destroying the desirable shape of the opening, provision is made for enlarging the height of the opening by shifting the movable frame described.

To that end the sliding frame is mounted in position at the rear of the wires 9 by spring clips such as indicated at 21 and 22. There is one of these clips 21 at each end of the sliding frame and each clip is of a general U-form, the free ends of the side legs 23 having lateral hooks 24 which are hooked over the upper and lower horizontal wires 14, with the legs 23 passing behind the end vertical wires 9 and also behind the vertical wire 16 of the sliding frame, with the connecting portion 21 bent to hook form and hooked about the forward side of a stationary rod 25 which extends between and is connected with the frame bars 5 and 6 to form a slide rod. The clip 22 is employed at or near the central portion of the sliding frame to cause the wires 14 to closely hug the vertical wires 9, the free ends 22" of the legs 22' of this clip being placed in front of an upper wire 14 of the sliding frame and behind the next lower wire 14, while the connecting portion 22 is placed over or in front of a vertical wire 9. The effect of these clips is to provide a strong frictional tendency against any movement so that the frame remains in any position in which it has been placed by the attendant. When the chicks reach a larger stage of growth this frame is slid upwardly a predetermined distance as shown in Fig. 3 to increase the height and width of the feed openings, the distance between the vertical wires 9 then representing the greatest width, and as they reach a still larger stage of growth it may be again moved upwardly to again increase the height of the feed openings, the greatest width remaining the same.

The zig-zag wire 11 will of course be positioned so that the upper apex 15 will come centrally between the vertical wires 9 and the dimensions of these parts is such that when adjusted to any given growth of chicks, the central or widest parts of the openings will be of such dimensions as to prevent the escape of the chicks.

The front of each cage has a door, the door opening being between the upper and lower rods 5 and 6 and the vertical rods 7, but one rod 7 being shown in the present case. The door frame consists of a rod 27 bent to form a rectangle with its ends suitably connected preferably by welding. The door frame is provided with the same vertical wires and adjustable feed openings just described, a description of which need not be repeated. The door frame is suspended from the rod 5 by a pair of hinge members each consisting of a wire 28 bent to the form as best shown in Fig. 7 and also by a pair of members 29 (only one of which is shown) each of which is suitably connected to the frame of the door and has a loop-shaped portion 29' at its upper end which hangs on the rod 5. Each of the hinge members 28 is rigidly secured, preferably by welding, to the rod 5 and it will be noticed in Fig. 7 that the lower portion is formed with a pronounced U-bend 30 in which rests the upper rod 31 of the door frame when the door is in the closed position. This arrangement results in having two hinge centers in alignment whereby any tendency of the door to swing on either center is prevented by the other. The hinge member 28, in addition to the lower U-bend 30, also has two laterally-extending U-bends 30' and 30". To open the door, the door is raised bodily until the upper rod 31 thereof assumes a position beneath the rod 5 as indicated by dotted lines at 31', the loop 29' being moved a corresponding distance upward but still embracing the rod 5. After the door has been moved to this position, it may be swung inwardly and the rod 31 positioned in the bend 30' as indicated by dotted lines at 31$^b$, or the door may be swung outwardly and the rod 31 positioned in the bend 30" as indicated by dotted lines at 31$^a$. As, in either one of these positions, the loop 29' still embraces the rod 5, the door will be held in either one of its open positions, as the engagement of the loop with the rod 5 will prevent the door from swinging downwardly. When it is desired to release the door the attendant merely positions the rod 31 in the dotted line position shown at 31' and then releases it, the rod 31 dropping to the U-bend 30 and the door swinging by gravity to closed position.

Another form of the invention is shown in Figs. 8 to 18 inclusive. These figures show in addition to a modified form of feed-opening having converging V-shape tops, also modifications in the means of retaining the sliding frames in any position. In general the coop frames are constructed exactly as described and shown for the form just described and like reference characters are assigned to like parts unless otherwise specified. One of the differing elements is the substitution of a wire 33 for the wire 10 of the first embodiment. The wire 33 is secured to the rear sides of the vertical wires 9a in horizontally disposed relation as compared to an upper zig-zag wire 34 at a point just above the frame rod 6a (Figs. 9 and 10), while the upper zig-zag wire 34 is against a part of a sliding frame as previously described. The bent portions of each zig-zag wire, indicated at 12a and 13a are in contact with each other when it is desired to reduce the feed openings to their smallest dimensions suitable for chicks in the first stage of growth.

The zig-zag wires 33 and 34 will of course be positioned so that the upper apex 15a and the lower apex 26 will be centrally located between the vertical wires 9a.

In one of the modifications in the frame retaining means, (Figs. 16, 17 and 18) the wire 34 is formed at each end with an eye 35 which encircles loosely a vertical rod 36 in which are indentations at suitably spaced intervals. Two rods 36 are used, one at either end of the space over which the sliding frame extends, but one only being shown in the present case. In the longer sliding frames close contact of the frame with the rearward sides of the vertical partition wires 37 is secured by use of resiliently supported spring clips 22a. The clips 22a are horizontally arranged clips of spring-tempered wire and are employed at or near the central portion of the sliding frame to cause the wires 14a to closely hug the vertical wires 9a, Figs. 9 or 12, or 37, Fig. 16, the ends of this clip being placed in front of two vertical wires 9a or 37 and about one of the short vertical connecting rods 17 which are provided for the purpose of staying the horizontal rods 14a of the frame. The clips 21 previously described are dispensed with in the form shown in Figure 16, as a sufficient frictional resistance against accidental movement is afforded by the engagement of the eyes 35 with the indentations in the rods 36. The indentations which are represented at 38, Fig. 17, are spaced substantially as shown, there being one at a point when the feed openings are in their smallest dimensions, and others thereabove, the uppermost being at a point which will retain the sliding frame so that the apex 15a of the inverted V formed in the wire 34 will attain the height of the fixed horizontal bracing wire 40. Feed or water troughs are indicated at 19'.

A modified form of hinge is shown in Fig. 14, in which form the door is allowed a movement in one direction only. The wire 28a is formed as shown, having a downwardly depending U-bend 30a in which the upper rod 31 rests when the door is in the locked, closed position. The operation of the door is similar to that already described, the broken circle 31' showing the height to which the door is lifted before the open position indicated at 31'' is assumed.

In operation, the sliding frames in the various panels are placed in the position shown in Figs. 1, 2, 6 and 8 referring to the first embodiment of the invention, or in the positions shown in Figs. 8, 9, 13, 15 and 16 referring to the modified form of wire cage coop, to make feed openings of the smallest size. For a larger stage of growth the sliding frames are moved so as to afford feed openings of greater height, such as shown in Figs. 3 and 10.

Having thus described my invention, I claim:

1. In a brooder cage, wire members forming feed openings, one at least of said members being movable to vary the height of said openings, the upper portion of each feed opening being of gradually narrowed width.

2. In a brooder cage, an upper zigzag wire member and a lower member forming the upper and lower portions of feed openings, the walls of each opening in the upper member being converged, said upper member being adjustable vertically with relation to said lower member.

3. In a brooder cage, spaced vertical wires and upper and lower cross-wires forming feed openings, said cross-wires being relatively movable in a vertical direction to vary the height of each opening, the walls of the openings formed by the upper cross-wires being gradually converged.

4. In a brooder cage, spaced vertical wires and upper and lower cross-wires forming feed openings, the upper cross wire being zigzag and vertically movable to vary the height of each opening, the walls of each opening in the upper cross-wire being gradually converged, 5. In a brooder cage, spaced vertical wires and upper and lower cross-wires forming feed openings, the upper cross-wire being zig-zag and vertically movable to vary the height of each opening, the walls of each opening in the upper cross-wire being gradually converged, and means for yieldably holding said upper cross-wire in different positions of adjustment.

6. In a brooder cage, a pair of wire members forming feed openings, each opening having its sides converged toward the top and bottom of the opening, one at least of said members being movable vertically whereby the height of each opening may be varied.

7. In a brooder cage, a pair of wire members forming feed openings, each opening of which has its upper and lower portions converged, one at least of said members being mounted for vertical adjustment, together with means for holding the said adjustable member in different positions of adjustment, whereby the height of each opening may be varied.

8. In a brooder cage having spaced vertical bars, a pair of wire members forming feed openings between said bars each of which openings has converged upper and lower portions, one at least of said members being vertically adjustable in the direction of the lengths of said bars to vary the height of each opening.

9. In a brooder cage having spaced vertical bars, a pair of horizontal wire members forming feed openings between said bars, each of said openings having converged upper and lower portions, means for supporting one of said members permanently at the lower ends of said bars, means for supporting the other member for vertical movement with relation to the stationary member, and means for holding the movable member in different positions of adjustment.

10. In a brooder cage, transversely extending wire members arranged in parallel closely adjacent vertical planes, said members being relatively movable in a vertical direction, one member having V-shaped notches and the other inverted V-shaped notches, said notches cooperating to form feed openings, each opening being varied as to height upon a relative movement of said members.

11. In a brooder cage, transversely extending wire members arranged in parallel closely adjacent vertical planes, one of said members being stationary and the other vertically movable, said members each having V-shaped notches, said notches cooperating to provide feed openings, each opening being varied as to height upon a movement of said movable member.

12. In a brooder cage, a plurality of vertical spaced bars formed of wire, a pair of zig-zag cross-wires, the zig-zag formation of said wires forming V notches therein, said cross-wires being relatively movable in a vertical direction with the notches cooperating to form feed openings which are each variable as to height upon a relative movement of said cross-wires.

13. In a brooder cage, a plurality of vertical bars, a pair of zig-zag wires extending across said vertical bars, one above the other, the zig-zag formation of said wires cooperating to form feed openings having V-shaped upper and lower ends, said lower cross-wire being stationary and said upper cross-wire movable in a vertical direction to vary the height of each feed opening.

14. In a brooder cage, a plurality of vertical spaced bars, a stationary zig-zag member adjacent the lower end of said bars, a vertically slidable frame including a plurality of cross members, the lower cross-member of said frame being formed of zig-zag wire cooperating with said lower zig-zag member to provide feed openings each having converged upper and lower portions.

15. In a brooder cage having feed openings the top and bottom of which have converging sides, each top and bottom comprising a zig-zag wire, and means whereby one of the wires may be moved for varying the height of each opening without altering the converging form of the top and the bottom thereof.

THOMAS H. HART.